Patented Dec. 27, 1949

2,492,334

UNITED STATES PATENT OFFICE 2,492,334

STABILIZATION OF ORGANIC COMPOUNDS

Ralph B. Thompson, Riverside, Ill., assignor to Universal Oil Products Company, Chicago, Ill., a corporation of Delaware No Drawing. Application April 12, 1947, Serial No. 740,995

19 Claims. (Cl. 99—163)

This invention relates to the stabilization of organic compounds which tend to deteriorate in storage or in use due to oxidation reactions.

Various organic compounds including motor fuel, particularly cracked gasoline, polymer gasoline, Diesel oil, etc., mineral oil, lubricating oil, fuel oil, drying oil, greases, rubber, edible fats and oils, etc., are adversely affected by oxygen, with the resultant formation of undesirable gum, discoloration, rancidity or other deleterious reactions.

The invention is particularly applicable to the stabilization of edible fats and oils which generally are of animal or vegetable origin and which tend to become rancid, especially during long periods of storage prior to use. Typical representatives of these edible fats and oils include linseed oil, menhaden oil, cod liver oil, castor oil, olive oil, rapeseed oil, coconut oil, palm oil, corn oil, sesame oil, peanut oil, babassu oil, butter, fat, lard, beef tallow, etc., as well as hydrogenated oils and fats as sold under various trade names including "Spry," "Crisco," "Snowdrift," etc. It is understood that other oils and fats may be treated within the scope of the present invention, including oils and fats which have previously been subjected to various treatments, such as blowing with air, heat treatment, etc.

In one embodiment the present invention relates to a method of stabilizing an organic material subject to oxidative deterioration which comprises adding thereto an inhibitor comprising a ketone having a sulfur atom attached to the carbon atom beta to the keto group.

In a specific embodiment the present invention relates to a method of stabilizing edible fats and oils against rancidity which comprises incorporating therein an inhibitor comprising a β-alkylthioalkanone and preferably 2,6-bis-(ethylthio)-2,6-dimethyl-heptanone-4.

In another specific embodiment the present invention relates to a method of stabilizing edible fats and oils against rancidity which comprises incorporating therein an inhibitor comprising a 2,6-bis-(α-alkylthioaralkyl)-cyclohexanone and particularly 2,6-bis-(α-ethylthiobenzyl)-cyclohexanone.

In still another specific embodiment the present invention relates to a method of stabilizing edible fats and oils against rancidity which comprises incorporating therein an inhibitor comprising a β-(hydroxyalkylthio)-alkanone and particularly 1-(2,3-dihydroxypropylthio)-butanone-3.

The preferred inhibitors of the present invention are prepared by reacting an α,β-unsaturated ketone with a mercapto compound and preferably a mercaptan. Suitable unsaturated ketones include vinyl methyl ketone, vinyl ethyl ketone, vinyl propyl ketone, vinyl butyl ketone, vinyl phenyl ketone, vinyl tolyl ketone, etc., mesityl oxide, phorone, benzalacetone, dibenzalacetone, benzalacetophenone, dypnone, dibenzalcyclohexanone, etc. Of the mercapto compounds, the primary lower mercaptans are preferred, including methyl mercaptan, ethyl mercaptan and propyl mercaptan, although higher primary mercaptans containing up to about 8 carbon atoms may be used. In general the primary mercaptans are more reactive than the secondary mercaptans, including isopropyl mercaptan, sec-butyl mercaptan, sec-amyl mercaptan, etc., which in turn are more reactive than the tertiary mercaptans, including tertiary-butyl mercaptan, tertiary-amyl mercaptan, tertiary-hexyl mercaptan, etc., both in ease of reaction with ketones and in inhibitor potency of the final product in certain classes of organic materials. Aromatic mercaptans include thiophenol, thiocresol and particularly p-thiocresol, thioxylenol, thiohydroquinone, etc. As a rule the aromatic mercaptans react more readily with the ketones but in general the inhibitors formed from the aromatic mercaptans are not as potent in some organic materials as are the products formed from primary aliphatic mercaptans.

The reaction of a mercaptan and a α,β-unsaturated ketone is readily effected, preferably in the presence of a catalyst. Where the ketone used contains at least one hydrogen atom on the carbon atom beta to the keto group, the reaction is readily effected in the presence of a basic catalyst such as piperidine, sodium methylate, quaternary ammonium hydroxide, etc. When desired an acid catalyst such as anhydrous hydrogen chloride, anhydrous hydrogen bromide, anhydrous hydrogen fluoride, etc., may be employed. In general the acid catalyst is more effective than the basic one and is particularly useful when the α,β-unsaturated ketone does not contain at least one hydrogen on the β-carbon atom. In some cases it is desirable to warm the mixture in order to promote the reaction.

It has been found that certain groups activate the mercaptans and particularly the aliphatic mercaptans insofar as their reactivity with ketones is concerned. Thus thioglycolic acid, thiolactic acid, thioglycerol, mercaptoethanol, etc., are the most reactive mercapto compounds, and the products formed therefrom are among the preferred inhibitors of the present invention.

Representative inhibitors in this category include 2,6-dimethyl-2,6-bis-(β-hydroxyethylthio)-heptanone-4, formed by the reaction of one mol of phorone with 2 mols of mercaptoethanol, β-β'-bis-(2,3-dihydroxypropylthio)-dibenzylacetone, formed by the reaction of dibenzalacetone with thioglycerol, β-(2,3-dihydroxypropylthio)-ethyl methyl ketone, formed by the reaction of vinyl methyl ketone with thioglycerol, etc.

Other suitable inhibitors within the scope of the present invention include compounds formed by the reaction of an α,β-unsaturated ketone with heterocyclic nitrogen or sulfur ring mercapto compounds such as mercaptopyrrole, mercaptopyrroline, mercaptopyrrolidine, mercaptopyridine, mercaptopiperidine, mercaptothiophene, mercaptotetrahydrothiophene, thiopyrine, etc. It is understood, of course, that these heterocyclic rings may contain substituent groups consisting of carbon, nitrogen and/or sulfur atoms.

The inhibitors of the present invention may be illustrated by the following general formula:

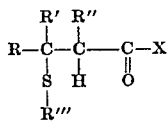

where R, R' and R'' are selected from the group consisting of hydrogen, alkyl, alkenyl, aryl, aralkyl, alkaryl, cycloalkyl and heterocyclic ring radicals. It is understood that these substituent groups may in turn be substituted by radicals such as hydroxyl, amino, and mono- or dialkyl-amino, etc. In another embodiment of the invention R and R' may comprise carbon atoms forming a polymethylene ring. R''' in the above formula is selected from the group consisting of alkyl, alkenyl, aryl, aralkyl, alkaryl, cycloalkyl, and heterocyclic ring radicals. Here again it is understood that these substituent groups may be substituted by hydroxyl, amino or alkylyamino radicals. X in the above formula may be the same as R, it may comprise a carbon atom forming a polymethylene ring with R'', or it may be a hydrocarbon radical having a sulfur atom attached to a carbon atom beta to the keto group.

It is understood that an extensive number of compounds may be prepared and used within the broad scope of the present invention but that, while all of these compounds will have some inhibitor potency in stabilizing organic materials, they are not necessarily of equivalent activity.

Referring again to the general formula hereinbefore set forth, representative compounds are illustrated below.

Where R, R' and R'' are hydrogen atoms, R''' is an ethyl radical and X is a methyl radical, the inhibitor will comprise 4-ethylthiobutanone-2. This compound is readily prepared by the reaction of methyl vinyl ketone and ethyl mercaptan in the presence of a trace of piperidine. An inhibitor similar to the above but in which R and R' are methyl radicals will comprise 4-ethyl-thio-4-methyl pentanone-2, which compound is readily prepared by the reaction of mesityl oxide with ethyl mercaptan in the presence of anhydrous hydrogen chloride. Another compound similar to the above except that X comprises an isobutenyl radical is 2,6-dimethyl-2-ethylthio-hepten-5-one-4, which is formed by the reaction of phorone with ethyl mercaptan in the presence of a trace of piperidine. Another compound similar to the above except that R' and X are phenyl radicals comprises 1,3-diphenyl-3-alkylthiopropanone-1, which compound is formed by the reaction of benzalacetophenone with ethyl mercaptan in the presence of piperidine.

Another typical compound falling within the above general formula is one in which R and R' are methyl radicals, R'' is hydrogen, R''' is an ethyl radical and X is a β-methyl-β-ethylthio-propyl radical as in 2,6-bis-(ethylthio)-2,6-dimethyl-heptanone-4 which is formed by the reaction of phorone with ethyl mercaptan in the presence of hydrogen chloride. Another typical compound is one in which R and R'' are hydrogen atoms, R' is a phenyl radical, R''' is an ethyl radical and X is an α-ethylthiophenethyl radical as in 1,5-diphenyl-1,5-bis-(ethylthio)-pentanone-3, which is formed by the reaction of dibenzalacetone with ethyl mercaptan in the presence of piperidine.

It is understood that the compounds hereinbefore set forth and those shown in the following examples are merely representative of satisfactory inhibitors. The sulfur should be divalent with both valences of the sulfur atom attached to carbon atoms. It is essential in all these inhibitors that the sulfur atom is attached to a carbon atom beta to the keto group as it has been found that compounds in which the sulfur atom is attached to the carbon atom alpha to the keto group are not good inhibitors. Further it is generally preferred that the total number of carbon atoms in the inhibitor is not greater than about 25, as it has been found that, within certain limits, the potency of the inhibitor decreases with inclusion of hydrocarbon radicals of high molecular weight.

The inhibitor of the present invention is generally added to the organic material in amounts of less than 1% by weight. When used in edible fats and oils the inhibitor will generally be employed in amounts of from about 0.001% to about 0.5% by weight and when used in gasoline the inhibitor will generally be used in amounts above 0.02% by weight. The inhibitor may be used alone or in conjunction with synergists, inhibitor activators, dyes, antiknock agents, etc., depending upon the material to be stabilized. For example, when used in edible fats and oils a synergist such as phosphoric acid or ascorbic acid, will generally be used along with the inhibitor. When used in gasoline, lead tetraethyl, a dye and perhaps an inhibitor activator, such as certain types of alkylene polyamines, may be used.

The following examples are introduced to illustrate further the novelty and utility of the present invention, but not with the intention of unduly limiting the same.

A considerable number of inhibitors of the present invention have been prepared and tested in 2 different lards and in gasoline. One of the lards used in these tests had a normal stability period of 4½ hours and the other lard had a normal stability period of 9 hours as determined by the "Swift" test. This test is described in detail in the article by A. E. King, H. L. Roschen and W. H. Irwin, which appeared in the Oil and Soap, vol. X, No. 6, pages 106–109 (1933). In general this test comprises bubbling air through a sample of the lard until rancidity is determined organoleptically and by peroxide values.

The gasoline used in these tests was a Pennsylvania cracked gasoline which had a blank induction period of 60 minutes. The induction period is determined by the oxygen bomb stability test which is the standard method for evaluating the storage stability of gasolines.

The inhibitors of the present invention were prepared by reacting an α,β-unsaturated ketone with a mercapto compound without a catalyst or in the presence of piperidine or anhydrous hydrogen chloride. In some cases the reaction mixture was warmed to expedite the reaction.

EXAMPLE I

This example comprises a series of tests in which 0.02% by weight of the inhibitor was added to a 4½ hour lard, with the following results. These results are reported as the number of hours until the lard developed a peroxide value of 20.

Table I

| Inhibitor | Hours |
| --- | --- |
| None | 4½ |
| β-(2,3-dihydroxypropylthio)-ethyl methyl ketone | 58 |
| 1,5-bis-(ethylthio)-1,5-diphenyl-pentanone-3 | 58 |
| 2,6-bis-(α-ethylthiobenzyl)-cyclohexanone | 48 |
| β-ethylthiobenzylacetone | 57 |

EXAMPLE II

In this example 0.02% by weight of the inhibitor was added to a 9 hour lard and the results reported below are the number of hours until the lard developed a peroxide value of 20.

Table II

| Inhibitor | Hours |
| --- | --- |
| None | 9 |
| 2,6-bis-(ethylthio)-2,6-dimethylheptanone-4 | 105 |
| 1,5-bis-(ethylthio)-1,5-diphenylpentanone-3 | 70 |
| 1,3-diphenyl-3-alkylthiopropanone-1 | 58 |
| 1,3-diphenyl-3-alkylthiobutanone-1 | 46 |
| 2,6-dimethyl-2,6-bis-(β-hydroxyethylthio)-heptanone-4 | 83 |
| 2,6-dimethyl-2-ethylthio-hepten-5-one-4 | 61 |

In place of using a single mercaptan for reaction with the α,β-unsaturated ketone, it has been found that a mixed mercaptan fraction may be used with good results. For example, a mercaptan fraction recovered from cracked gasoline by treatment with a caustic-methanol solution was reacted with various ketones and the products formed thereby are good inhibitors. Some examples of inhibitors formed in this manner are identified in the above table as alkylthio and dialkylthio compounds.

EXAMPLE III

In this example 2,6-bis-(ethylthio)-2,6-dimethylheptanone-4 was tested in Pennsylvania cracked gasoline, with the following results, reported as the induction period in minutes.

Table III

| Inhibitor | Minutes |
| --- | --- |
| None | 60 |
| 0.2% by weight | 85 |
| 0.4% by weight | 460 |
| 0.6% by weight | 2400 |

I claim as my invention:

1. A method of stabilizing an organic material subject to oxidative deterioration which comprises adding thereto an inhibitor comprising a ketone having a sulfur atom attached to the carbon atom beta to the keto group.

2. A method of stabilizing edible fats and oils against rancidity which comprises adding thereto an inhibitor comprising a ketone having a divalent sulfur atom attached to the carbon atom beta to the keto group.

3. A method of stabilizing motor fuel subject to oxidative deterioration which comprises adding thereto an inhibitor comprising a ketone having a divalent sulfur atom attached to the carbon atom beta to the keto group.

4. A method of stabilizing lubricating oil subject to oxidative deterioration which comprises adding thereto an inhibitor comprising a ketone having a divalent sulfur atom attached to the carbon atom beta to the keto group.

5. A method of stabilizing an organic material subject to oxidative deterioration which comprises adding thereto an inhibitor comprising a β-alkylthioalkanone.

6. A method of stabilizing edible fats and oils against rancidity which comprises adding thereto from about 0.001% to about 0.5% by weight of 2,6-bis-(ethylthio)-2,6-dimethylheptanone-4.

7. A method of stabilizing cracked gasoline which comprises adding thereto from about 0.02% to about 0.5% by weight of 2,6-bis-(ethylthio)-2,6-dimethylheptanone-4.

8. A method of stabilizing lubricating oil subject to oxidative deterioration which comprises adding thereto an inhibitor comprising 2,6-bis-(ethylthio)-2,6-dimethylheptanone-4 in an amount sufficient to retard said deterioration.

9. A method of stabilizing an organic material subject to oxidative deterioration which comprises adding thereto an inhibitor comprising a 2,6-bis-(α-alkylthioaralkyl)-cyclohexanone.

10. A method of stabilizing edible fats and oils against rancidity which comprises adding thereto from about 0.001% to about 0.5% by weight of 2,6-bis-(α-ethylthiobenzyl)-cyclohexanone.

11. A method of stabilizing an organic material subject to oxidative deterioration which comprises adding thereto an inhibitor comprising a β-(hydroxyalkylthio)-alkanone.

12. A method of stabilizing edible fats and oils against rancidity which comprises incorporating therein from about 0.001% to about 0.5% by weight of 1-(2,3-dihydroxypropylthio)-butanone-3.

13. A method of stabilizing an organic material subject to oxidative deterioration which comprises adding thereto an inhibitor comprising the condensation product of an α,β-unsaturated ketone with a mercapto compound.

14. A method of stabilizing edible fats and oils against rancidity which comprises incorporating therein from about 0.001% to about 0.5% by weight of an inhibitor comprising the condensation product of phorone with ethyl mercaptan.

15. A method of stabilizing cracked gasoline which comprises adding thereto from about 0.02% to about 0.5% by weight of an inhibitor prepared by condensing phorone with ethyl mercaptan.

16. An organic compound tending to deteriorate due to oxygen containing a ketone having a sulfur atom attached to a carbon atom beta to the keto group, in an amount sufficient to retard said deterioration.

17. Edible fats and oils tending to become rancid containing a ketone having a sulfur atom attached to the carbon atom beta to the keto group, in an amount sufficient to retard rancidity.

18. Cracked gasoline containing a ketone having a sulfur atom attached to the carbon atom beta to the keto group, in an amount sufficient to retard oxidative deterioration.

19. Edible fats and oils tending to become rancid containing from about 0.001% to about 0.5% by weight of 2,6-bis-(ethylthio)-2,6-dimethyl-heptanone-4.

RALPH B. THOMPSON.

REFERENCES CITED

The following references are of record in the file of this patent:

UNITED STATES PATENTS

| Number | Name | Date |
|---|---|---|
| 2,320,287 | Lieber et al. | May 25, 1943 |
| 2,396,156 | Clarkson | Mar. 5, 1946 |